(12) United States Patent
Smith et al.

(10) Patent No.: US 8,177,256 B2
(45) Date of Patent: May 15, 2012

(54) VEHICLE SEAT HAVING AN INTEGRATED AIRBAG MODULE

(75) Inventors: Rodger Smith, Ludlow (GB); Rainer Penzel, Freising (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/080,324

(22) Filed: Apr. 2, 2008

(65) Prior Publication Data

US 2008/0284143 A1 Nov. 20, 2008

(30) Foreign Application Priority Data

May 15, 2007 (DE) .......................... 10 2007 022 620

(51) Int. Cl.
*B60R 21/207* (2006.01)

(52) U.S. Cl. .............. 280/730.2; 280/728.3; 297/216.13

(58) Field of Classification Search .............. 280/730.2, 280/728.3; 297/216.13, 216.14; *B60R 21/207*
See application file for complete search history.

(56) References Cited

U.S. PATENT DOCUMENTS

| | | | |
|---|---|---|---|
| 5,762,363 A * | 6/1998 | Brown et al. ............... | 280/730.2 |
| 5,860,673 A * | 1/1999 | Hasegawa et al. ......... | 280/730.2 |
| 6,045,151 A | 4/2000 | Wu | |
| 6,206,466 B1 | 3/2001 | Komatsu | |
| 6,357,789 B1 | 3/2002 | Harada et al. | |
| 6,386,577 B1 | 5/2002 | Kan et al. | |
| 6,588,838 B1 | 7/2003 | Dick, Jr. et al. | |
| 2005/0006933 A1 | 1/2005 | Bargheer et al. | |
| 2006/0113765 A1 * | 6/2006 | Tracht ......................... | 280/730.2 |
| 2006/0113767 A1 * | 6/2006 | Tracht ......................... | 280/730.2 |
| 2006/0113770 A1 * | 6/2006 | Tracht ......................... | 280/730.2 |
| 2007/0040360 A1 * | 2/2007 | Riha et al. .................. | 280/728.3 |
| 2007/0200329 A1 * | 8/2007 | Ma .............................. | 280/743.1 |

FOREIGN PATENT DOCUMENTS

| | | |
|---|---|---|
| DE | 10 2005 033 677 A1 | 2/2007 |
| WO | WO 00/06426 | 2/2000 |

OTHER PUBLICATIONS

Search Report for related German application dated Apr. 27, 2010.

* cited by examiner

*Primary Examiner* — Faye M Fleming
*Assistant Examiner* — Keith Frisby
(74) *Attorney, Agent, or Firm* — MacMillan, Sobanski & Todd, LLC

(57) ABSTRACT

A vehicle seat includes a frame and a pad having a portion. A trim cover at least partially surrounds the frame and the portion of the pad. The trim cover includes a tear seam formed therein and has an underside disposed adjacent the portion of the pad. The seat further includes an airbag module having an inflator, a housing defining an opening, and an airbag deployable from a folded position within the housing to an expanded position extending outwardly through the opening of the housing. The seat further includes a deflector having a first portion mounted on the frame and a second portion extending outwardly from the first portion. During deployment of the airbag, the second portion flexes relative to the first portion to move the portion of the pad away from the underside of the trim cover. The airbag is directed between the deflector and the underside of the trim material.

8 Claims, 4 Drawing Sheets

VEHICLE SEAT HAVING AN INTEGRATED AIRBAG MODULE

BACKGROUND OF THE INVENTION

This invention relates in general to vehicle seats, and in particular to vehicle seats incorporating airbags mounted therein.

In recent years, vehicles are being equipped with side airbags which are deployable to a position lateral of an occupant of the vehicle. Some of these airbags are mounted within a vehicle seat in their non-deployed state. Commonly, the airbag is housed within an airbag module mounted in the outboard side bolster of the seat back of the vehicle seat. The modules include a housing containing a folded airbag and an inflator. The airbag module is typically surrounded by the foam padding and outer trim cover which covers the entire seat back. Upon detection of an impact condition in which the airbag is to be deployed, a controller energizes the inflator causing an expansion of gas within the airbag. The expansion of gas causes the airbag to rapidly expand and extend outwardly from the housing. Conventional seat backs incorporating these types of airbags often include an aperture or slot formed in the foam pad and break away seams formed in the trim cover to properly direct the expanding airbag through the bolster.

It is generally desirable to prevent loose fragmentation of the foam pad during airbag deployment when the airbag is forced through the slot of the foam padding. It is known to reduce foam fragmentation by molding a fabric net into the slot of the foam padding around the airbag module. Although the use of a fabric net helps to reduce foam fragmentation, this addition of a molded fabric net increases the cost of the vehicle seat.

SUMMARY OF THE INVENTION

This invention relates to a vehicle seat including a frame and a pad having a portion. A trim cover at least partially surrounds the frame and the portion of the pad. The trim cover includes a tear seam formed therein and has an underside disposed adjacent the portion of the pad. The seat further includes an airbag module having an inflator, a housing defining an opening, and an airbag deployable from a folded position within the housing to an expanded position extending outwardly through the opening of the housing. The seat further includes a deflector having a first portion mounted on the frame and a second portion extending outwardly from the first portion. During deployment of the airbag, the second portion flexes relative to the first portion to move the portion of the pad away from the underside of the trim cover. The airbag is directed between the deflector and the underside of the trim material.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
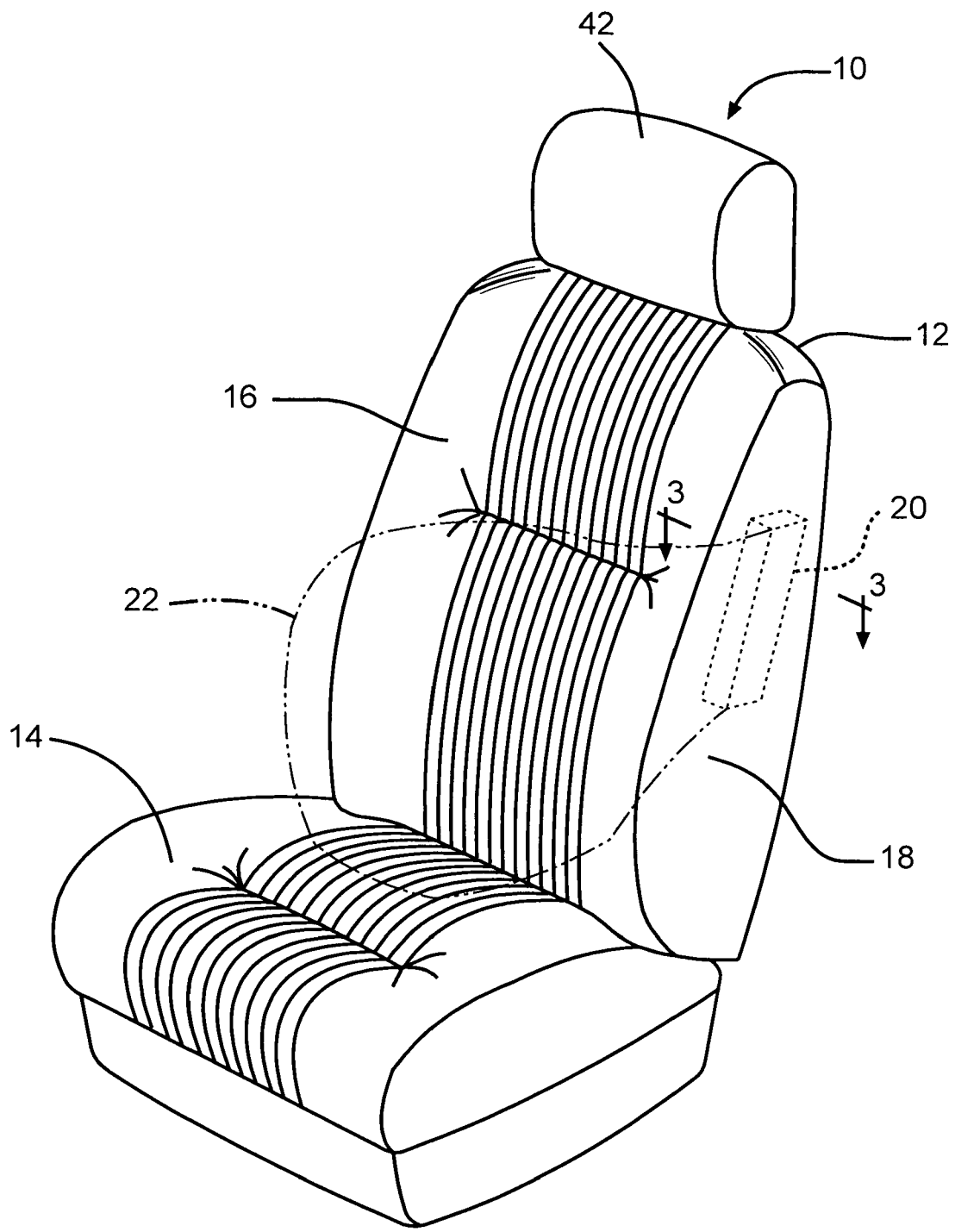
FIG. 1 is a perspective view of a vehicle seat.

Referring now to the drawings, there is illustrated in FIG. 1 a vehicle seat, indicated generally at 10. The seat 10 generally includes a seat back 12 and a seat cushion or bottom 14. The lateral sides of the seat back 12 define an inboard bolster 16 and an outboard bolster 18. An airbag module 20 is preferably mounted in the outboard bolster 18 of the seat 10. The airbag module 20 includes an airbag 22 which is deployable between a folded position and a deployed position, as indicated by phantom lines 22 in FIG. 1. When in the folded position, the air bag 22 can be in any folded state for reducing its storage size. When in the deployed position, the airbag 22 is inflated and generally located laterally of the occupant of the seat 10.

Figure 2:
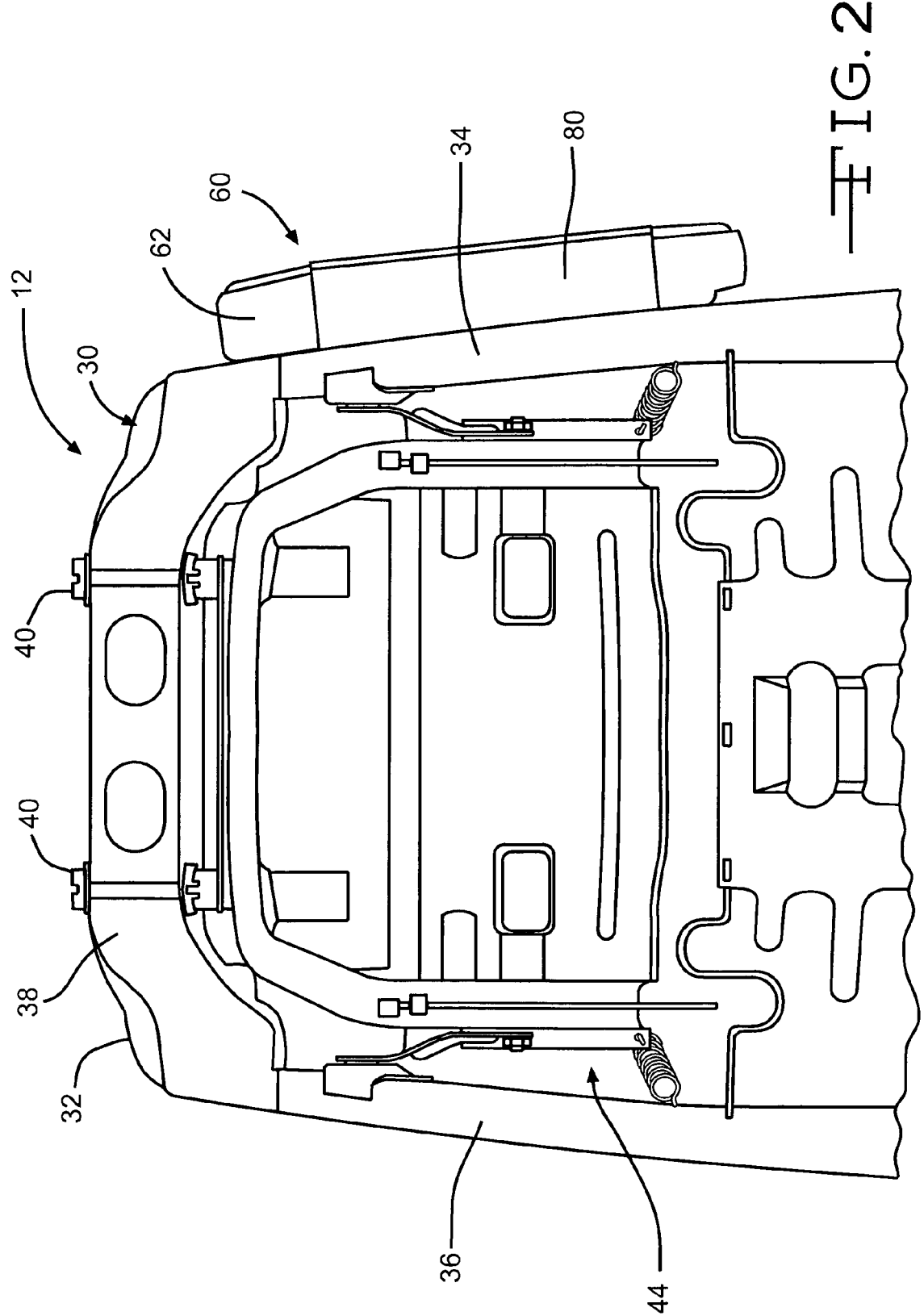
FIG. 2 is a front elevational view of a seat frame assembly and airbag module of the vehicle seat of FIG. 1.
Figure 3:
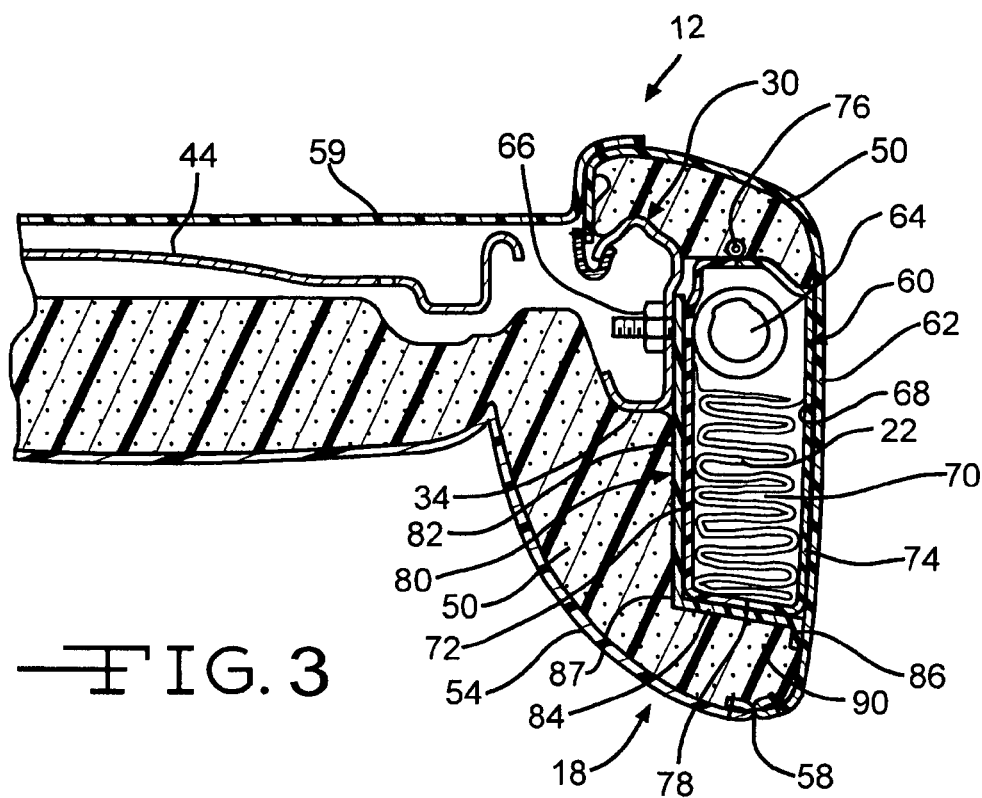
FIG. 3 is a cross-sectional view of the vehicle seat taken along lines 3-3 of FIG. 1.

As best shown in FIGS. 2 and 3, the seat back 12 is supported by a frame assembly, indicated generally at 30. The frame assembly 30 can have any suitable configuration and number of components which define a framework of the seat back 12. In the embodiment shown, the frame assembly 30 includes a perimeter frame 32 having a generally inverted U-shape. For example, the perimeter frame 32 may include generally vertical first and second side members 34 and 36 connected together at top portions thereof by a lateral cross bar 38. The perimeter frame 32 may be formed from a plurality of metal stampings. The embodiment of the seat 10 is preferably a driver's side seat such that the first side member 34 is oriented on the outboard side of the vehicle, and the second side member 36 is oriented on the inboard side of the vehicle. The cross bar 38 may include fasteners or any suitable mounting members 40 for the connection of a headrest assembly 42 (see FIG. 1). The frame assembly 30 may also include an adjustable lumbar assembly 44. The lumbar assembly 44 can be any suitable mechanism and/or conventional lumbar assembly which provides support to the lumbar portions of the occupant's back and which is moveable relative to the perimeter frame 32.

As shown in FIG. 3, the seat back 12 further includes a seat cushion or pad 50. The pad 50 may have any suitable configuration and may be made of any suitable material, such as for example a molded polymeric material such as polyurethane foam. The pad 50 may also be formed from a plurality of separate pads. The pad 50 generally surrounds the frame assembly 30 and provides cushioning support for the occupant seated on the seat 10. Of course, the pad 50 need not completely surround the frame assembly 30 but may only surround a portion of the frame assembly 30.

The seat back 12 further includes a trim cover 54 to generally define an exterior surface of the seat 10. The trim cover 54 may be made of any suitable material, such as fabric, vinyl, and/or leather. The trim cover 54 generally surrounds the pad 50 and may be disposed proximate one or more surfaces of the pad 50. The trim cover 54 may be attached to the pad 50 or other portions of the seat 10 by any suitable manner, such as with an adhesive, stitching, or fasteners. The trim cover 54 may be formed from a plurality of sections that are sewn or otherwise fastened together. The trim cover 54 includes an airbag tear seam 58 preferably located generally at the front portion of the outboard bolster 18, as shown in FIG. 3. However, it should be understood that the tear seam 58 could be located at different regions of the seat back 12, such as for example, towards the outboard side of the bolster 18. The tear seam 58 provides closure of the trim cover 54 during normal operation of the seat. However, during deployment of the airbag 22, the tear seam 58 opens to permit the expansion of the airbag 22. As shown in FIG. 3, the tear seam 58 may be defined as a sewn seam joining two edges of trim cover 54 together. The tear seam 58 is adapted to sever or split in response to a sufficient force exerted by the expansion of the expanding airbag 22. Alternatively, the tear seam 58 may be defined as a weakened or reduced thickness area of the trim cover 54 which will split open upon inflation of the airbag 22. As another alternative, a separate moveable cover panel (not shown) may be used to selectively cover an opening of the trim cover 54 through which the inflating air bag 22 deploys.

The trim cover 54 may cover the rear portion of the seat back 12 or alternatively, a back panel 59 may be used. The back panel 59 may be made of any suitable material, such as plastic and can be attached to the seat or trim cover 54 by any suitable manner.

The seat 10 further includes an airbag module 60 which generally includes a housing 62, an inflator 64, and the airbag 22. The airbag module 60 is preferably located within the outboard bolster 18 of the seat back 12. More preferably, the airbag module 60 is located between the side member 34 and an underside 68 of the trim cover 54. The airbag housing 62 and inflator 64 are preferably fixedly mounted relative to the frame assembly 30, such as by one or more bolts 66. Of course, the airbag housing 62 may be fixedly mounted relative to the frame assembly 30 in any suitable manner.

Figure 5:
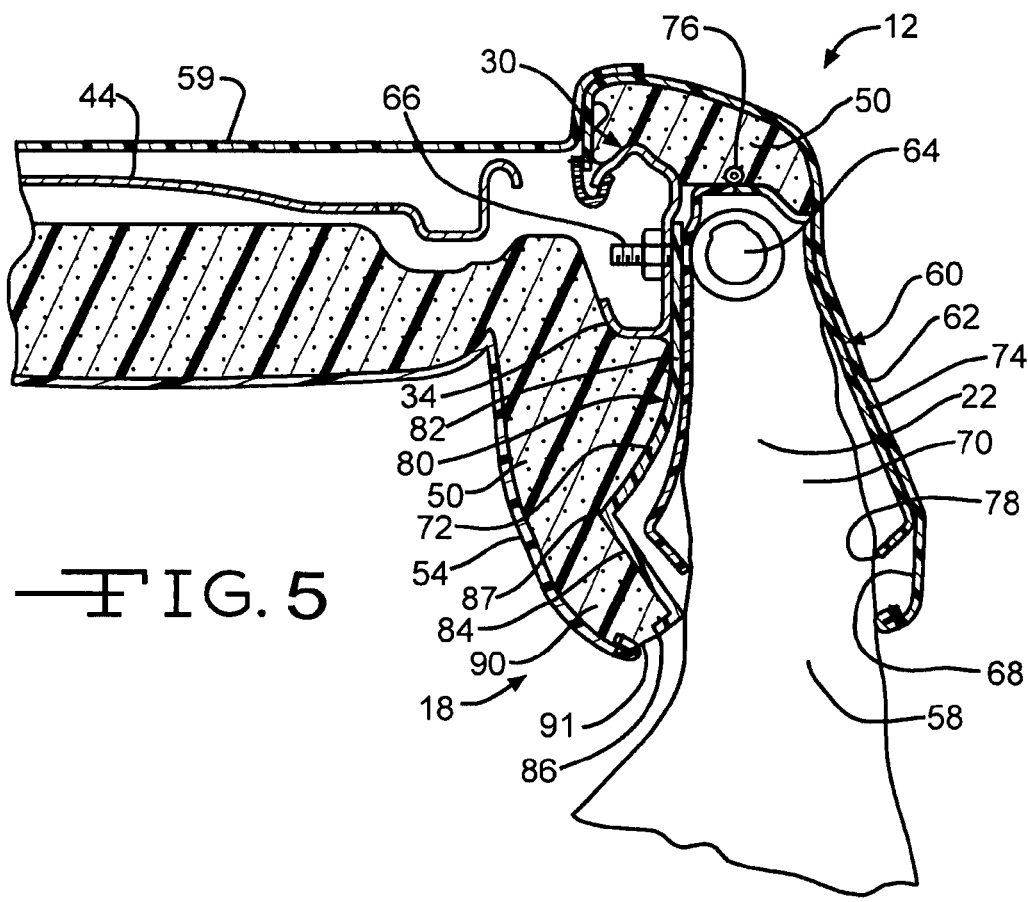
FIG. 5 is a cross-sectional view similar to FIG. 3 but illustrating the seat and the airbag module during deployment of the airbag.
Figure 4:
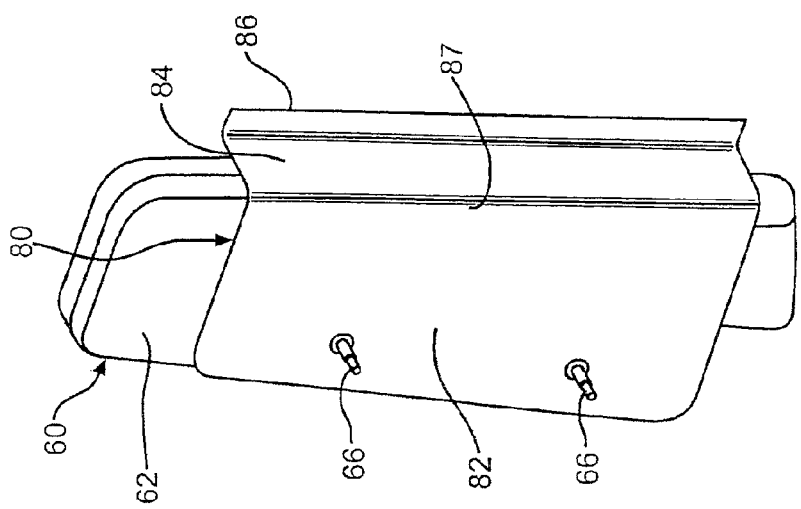
FIG. 4 is a perspective of an airbag module and deflector of the vehicle seat of FIG. 1.

As best shown in FIG. 4, the airbag housing 62 has a generally rectangular box shape. The housing 62 defines an interior 70 which houses the inflator 64 and the folded airbag 22. The housing 62 is preferably configured to open, as is illustrated in FIG. 5, to permit release of the expanding airbag 22 when so deployed. The housing 62 may be configured with separate first and second portions 72 and 74 which are connected on one side by a hinge 76 on one side. A closeable opening 78 is on the opposite side from the hinge 76. The opening 78 may be in the form of a joint seam where the first and second portions 72 and 74 are adjacent one another. Alternatively, the opening 78 may be formed as a tearable seam which is broken during expansion of the airbag 22, thereby permitting spreading movement of the first and second portions 72 and 74. As illustrated in FIG. 3, the first portion 72 is mounted on the side member 34 by the bolt(s) 66. The hinge 76 may be a separate structure mounted on the first and second portions 72 and 74 for allowing the first and second portions 72 and 74 to move relative to one another. Alternatively, the hinge 76 may be a living hinge (not shown) such that the first and second portions 72 and 74 are formed together. In yet another alternative, the opening 78 may be defined as a tear seam separating the first and second portions 72 and 74 which severs open upon expansion of the air bag 22 within the housing 62.

The inflator 64 can be any conventional air bag inflator mechanism capable of generating gases from a source, such as for example, a solid propellant. The expelled gases are directed into the airbag 22 for proper inflation of the airbag 22 during an impact condition, such as a collision. The inflating airbag 22 helps protect the occupant of the seat 10 during an impact situation.

The seat 10 further includes a deflector 80. As best shown in FIG. 4, the deflector 80 is preferably formed from a sheet formed such that it has a generally Z-shape cross-section. The Z-shaped cross-section of the deflector 80 is defined by a main panel 82, an end panel 84, and a flange 86. The main panel 82 is attached to the side member 34 of the frame assembly 30 such as by being disposed between the airbag housing 62 and the side member 34. It should be understood that the main panel 82 may be connected to the frame assembly 30 by any suitable manner. The end panel 84 extends from an edge portion 87 of the main panel 82 and is preferably positioned adjacent the opening 78 of the airbag housing 62. As will be described below, the deflector 80, and more particularly the end panel 84, helps direct the airbag 22 during its deployment. The flange 86 extends outwardly from the end panel 84 and preferably is shaped similarly with the adjacent portion of the underside 68 of the trim cover 54. The joining portions of the flange 86 and the end panel 84 generally surround a corner portion 90 of the pad 50.

The deflector 80 is preferably made of a material which is relatively rigid such that it can support itself and maintain its formed shape during normal operation of the seat 10 yet is flexible enough such that portions of the deflector 80 may deform or flex during deployment of the airbag 22, as will be discussed below. The deflector 80 is also preferably made of a flexible material having a tensile strength sufficient to withstand the force of the inflating airbag 22 without tearing. It has been found that a suitable material for the deflector 80 is a polymeric material, such as polypropylene or acrylonitrile butadiene styrene (ABS).

The operation of the seat 10 and airbag module 60 will now be discussed. As shown in FIG. 3, the air bag 22 is shown in a folded position within the housing 62 of the airbag module 60. Preferably, the deflector 80 is positioned adjacent the housing 62 such that the deflector 80 is disposed between the housing 62 and the pad 50. More specifically, the main panel 82 of the deflector 80 is disposed adjacent the first portion 72 of the housing 62. The end panel 84 of the deflector 80 is disposed adjacent the opening 78 of the housing 62 such that the end panel 84 is disposed between the opening 78 and the corner portion 90 of the pad 50.

Upon detection of an impact condition in which it is determined to deploy the airbag 22, a controller (not shown) energizes the inflator 64 to cause an expansion of gas within the folded airbag 22. The expansion of the airbag 22 causes the first and second portions 72 and 74 of the housing 62 to separate from one another. This separation causes an expansion of the opening 78 of the housing 62. During this initial stage of the expansion of the air bag 22, a portion of the airbag 22 is expelled through the opening 78, thereby causing further separation of the first and second portions 72 and 74 of the housing 62. As is shown in FIG. 5, the leftward movement of the first portion 72 of the housing 62 also moves portions of the deflector 80. More specifically, the edge portion 87 of the main panel 82, the end panel 84, and the flange 86 are moved in a generally inboard or leftward direction, as viewed in FIG. 5. As shown in FIG. 5, the housing 62 and/or the deflector 80 may be deformed or flexed from their original shape as shown in FIG. 3 during expansion of the airbag 22. For example, first and second portions 72 and 74 of the housing 62 and the main panel 82, the end panel 84, and/or the flange 86 of the deflector may be deflected from their original shape.

During expansion of the airbag 22, the flexing of the end panel 84 and the flange 86 moves the corner portion 90 of the pad 50 away from the underside 68 of the trim cover 54. This movement will likely cause compression of at least the corner portion 90 of the pad 50. The expanding airbag 22 is then directed between the deflector 80 and the underside 68 of the trim cover 54 as shown in FIG. 5. The deflector 80 helps minimize contact between the expanding airbag 22 and the corner portion 90 of the pad 50 to help prevent the corner portion 90 of the pad 50 from breaking off the pad 50 and being expelled into the interior of the vehicle during expansion of the airbag 22. As best shown in FIG. 3, if the seat 10 did not include the deflector 80, the expanding airbag 22 may puncture through the corner portion 90 of the pad 50, thereby separating the corner portion 90 from the remainder of the pad 50. Thus, it is preferred that a portion of the deflector 80 be positioned adjacent to the opening 78 and also positioned between the opening 78 of the housing 62 and the tear seam 58 of the trim cover 54. The deflector 80 also helps direct the expanding airbag 22 in a direction towards the underside 68 of the trim cover 54 instead of towards the pad 50. It is generally desirable to direct the airbag 22 away from the pad 50 so that the pad 50 does not break apart and also that the compression of the pad 50 does not interfere with misdirecting the airbag 22 during deployment.

It is noted that the inclusion of the flange 86 further helps to direct and move the corner portion 90 of the pad 50 away from the underside 68 of the trim cover 54. The flange 86 generally functions as a hook portion for grasping and moving the corner portion 90 away from the underside 68 of the trim cover 54. The flange 86 also helps minimize the inadvertent wrapping of an outermost portion 91 of the corner portion 90 around the end panel 84 during this rapid movement and compression of the corner portion 90. It is noted that the flange 86 may be sized to extend all the way to the tear seam 58 when in its original position or may only partially extend towards the tear seam 58, as shown in FIG. 3. In a preferred embodiment, the flange 86 does not extend to the tear seam 58 so that an occupant of the seat 10 does not feel the edge of the relatively rigid flange 86 while sitting in the seat 10. It should be understood that the deflector 80 need not include the flange 86. Thus, the deflector 80 could be formed solely from the main panel 82 and the end panel 84, thereby having an L-shaped cross-sectional shape.

Although the invention is described as being used with the seat back 12, the invention could also be practiced on other portions of the seat 10, such as for example, the seat bottom 14 wherein an air bag (not shown) would generally deploy upwardly and laterally to the occupant of the seat 10.

Figure 6:
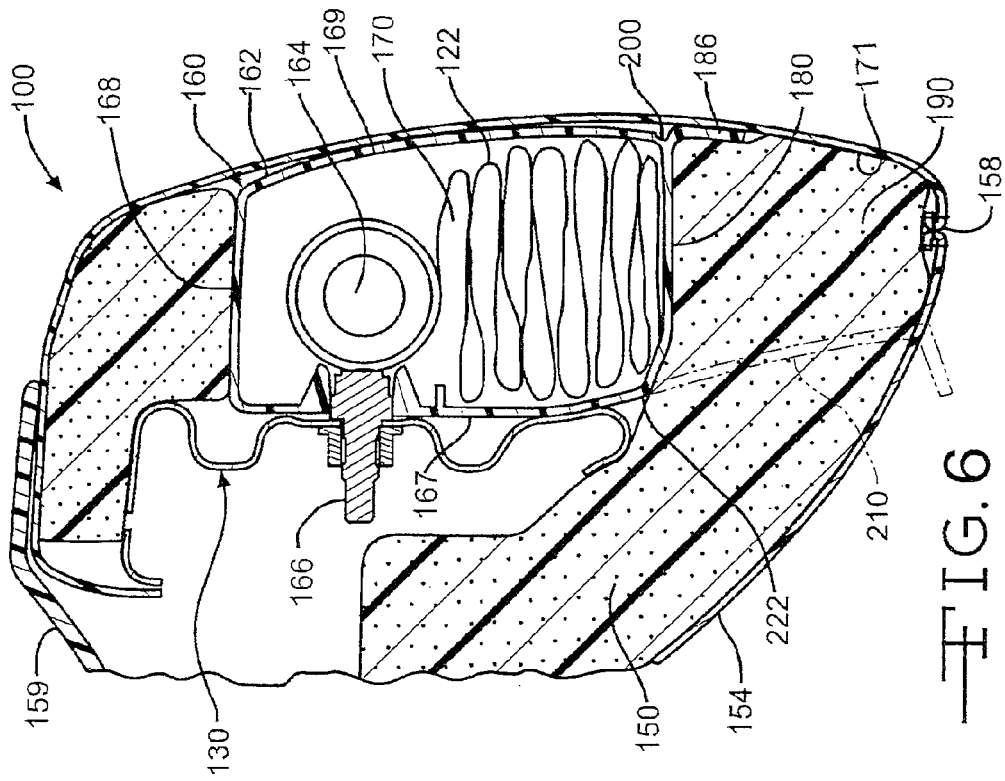
FIG. 6 is a cross-sectional view of an alternate embodiment of a portion of a vehicle seat.

There is illustrated in FIG. 6 a portion of an alternate embodiment of a seat back 100. The seat back 100 is similar to the function and structure of the seat 10 with one of the exceptions being that the airbag housing and the deflector are integrally formed together, as will be described below.

For simplicity, only the outboard side of the seat back 100 is shown in FIG. 6. The seat back 100 may include any suitable frame assembly 130, such as the type of frame assembly 30 described above with respect to the seat 10. The seat back 100 further includes a pad 150 which may have any suitable configuration and may be made of any suitable material, such as for example a molded polymeric material such as polyurethane foam. The pad 150 may also be formed from a plurality of separate pads. The pad 150 generally surrounds the frame assembly 130 and provides cushioning support for an occupant.

The seat back 100 further includes a trim cover 154 to generally define an exterior surface thereof. The trim cover 154 may be made of any suitable material and generally surrounds the pad 150. The trim cover 154 may be attached to the pad 150 or other portions of the seat back 100 by any suitable manner, such as with an adhesive, stitching, or fasteners. The trim cover 154 may be formed from a plurality of sections that are sewn or otherwise fastened together. The trim cover 154 includes an airbag tear seam 158. As shown in FIG. 6, the tear seam 158 may be defined as a sewn seam joining two edges of trim cover 154 together which is adapted to sever or split. Alternatively, the tear seam 158 may be defined as a weakened or reduced thickness area of the trim cover 154. The seat back 100 may further include a back panel 159.

The seat back 100 further includes an airbag module 160 which generally includes a housing 162, an inflator 164, and an airbag 122. Similar to the airbag 22, the airbag 122 is deployable between a folded position within the airbag module 160, as shown in FIG. 6, and a deployed position extended outwardly from the airbag module 160. The airbag housing 162 and inflator 164 are preferably fixedly mounted relative to the frame assembly 130, such as by one or more bolts 166. Of course, the airbag housing 162 may be fixedly mounted relative to the frame assembly 130 by any suitable manner.

The airbag housing 162 preferably has a generally rectangular box shape. The housing 162 defines an interior 170 which houses the inflator 164 and the folded airbag 122. The housing 162 includes a perimeter defined by a mounting wall 167, an end wall 168, an outboard wall 169, a deflector wall 180, and a flange 186. The mounting wall 167 is connected to the frame assembly 130 such as by the bolt 166, thereby fixedly mounting the airbag housing 162 to the frame assembly 130. The outboard wall 169 and the deflector wall 180 are preferably connected at a break away portion or seam 200. The seam 200 is preferably in the form of a reduced thickness area which will break under the forces caused by the expansion of the airbag 122, thereby separating the deflector wall 180 from the outboard wall 169, as will be described below. However, it should be understood that a seam 200 is not required such that the outboard wall 169 and the deflector wall 180 are either not connected or releasably connected together by fasteners (not shown). The walls 167, 168, 169, and 180 and the flange 186 may be integrally formed together or formed separately. The walls 167, 168, 169, and 180 may be formed from any suitable material, such as polypropylene or acrylonitrile butadiene styrene (ABS).

The operation of the seat 100 and airbag module 160 will now be discussed. As shown in FIG. 6, the air bag 122 is shown in a folded position within the housing 162 of the airbag module 160. Upon detection of an impact condition in which it is determined to deploy the airbag 122, a controller (not shown) energizes the inflator 164 to cause an expansion of gas within the folded airbag 122. The expanding airbag 122 causes the seam 200 to break permitting the deflector wall 180 and flange 186 to move away from the outboard wall 169 to an extended position indicated by broken lines 210. In a preferred embodiment, the deflector wall 180 generally pivots about a living hinge portion 222. Additional or alternatively, the deflector wall 180 may deform or flex in a similar manner as the deflector 80 described above with respect to the seat 10. During the initial expansion of the airbag 122 the deflector wall 180 moves a corner portion 190 of the pad 150 away from an underside 171 of the trim cover 154 such that the airbag 122 is directed between the deflector wall 180 and the underside 171 of the trim cover 154. Thus, the deflector wall 180 and flange 186 function similarly to the deflector 80 and flange 86 to direct the airbag against the trim cover 154 and to help prevent the corner portion 90 of the pad 150 from breaking off. Further expansion of the airbag 122 will cause the tear seam 158 to sever open permitting full deployment of the airbag 122 in a similar manner as the airbag 22 discussed above.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A seat comprising:
a frame member;
an airbag module supported on the frame member, the airbag module including a first housing part and a second housing part having respective portions that are disposed adjacent to one another at a joint seam, the airbag module further including an airbag that is deployable from a non-expanded position, wherein the airbag is disposed within the first and second housing parts, to an expanded position, wherein the airbag extends outwardly from the first and second housing parts through an opening defined at the joint seam by separation of the respective portions of the first and second housing parts;
a deflector including a main panel that is supported on the frame and an end panel that extends at an angle from the main panel, the end panel being disposed adjacent to the joint seam of the first and second housing parts when the airbag is in the non-expanded position;
a trim cover having a portion that includes a tear seam; and
a pad having a portion that is disposed between the end panel of the deflector and the tear seam of the trim cover when the airbag is in the non-expanded position, wherein:
the deflector is made of a material that is sufficiently rigid such that it can support itself and maintain its formed shape during normal operation of the seat, yet is flexible enough such that portions of the deflector flex when the airbag is deployed from the non-expanded position to the expanded position; and wherein
the deflector is spaced apart from the tear seam and not connected to the trim cover such that when the airbag is deployed from the non-expanded position to the expanded position, the flexing of the deflector moves the portion of the pad away from the air bag.

2. The seat defined in claim 1 wherein the trim cover includes an underside, and wherein the end panel of the deflector engages the underside of the trim cover when the airbag is in the non-expanded position.

3. The seat defined in claim 1 wherein when the airbag is moved from the non-expanded position to the expanded position, the end panel of the deflector flexes relative to the main panel of the deflector to move the pad away from the trim cover.

4. The seat defined in claim 1 wherein the deflector further includes a flange that extends at an angle from the end panel.

5. The seat defined in claim 4 wherein the trim cover includes an underside, and wherein the flange of the deflector engages the underside of the trim cover when the airbag is in the non-expanded position.

6. The seat defined in claim 1 wherein the first housing part and the second housing part are connected together by a hinge.

7. The seat defined in claim 1 wherein the deflector is made of a polymeric material.

8. The seat defined in claim 7 wherein the deflector is made of polypropylene or acrylonitrile butadiene styrene.

* * * * *